(12) United States Patent
Jabado et al.

(10) Patent No.: US 8,356,936 B2
(45) Date of Patent: Jan. 22, 2013

(54) SUBSTRATE WITH APPLIED COATING AND PRODUCTION METHOD

(75) Inventors: Rene Jabado, Berlin (DE); Jens Dahl Jensen, Berlin (DE); Ursus Krüger, Berlin (DE); Daniel Körtvelyessy, Berlin (DE); Volkmar Lüthen, Berlin (DE); Ralph Reiche, Berlin (DE); Michael Rindler, Schöneiche (DE); Raymond Ullrich, Schönwalde (DE)

(73) Assignee: Siemens Aktiengesellschaft, München (DE)

( * ) Notice: Subject to any disclaimer, the term of this patent is extended or adjusted under 35 U.S.C. 154(b) by 1334 days.

(21) Appl. No.: 11/992,712

(22) PCT Filed: Sep. 27, 2006

(86) PCT No.: PCT/EP2006/066795
§ 371 (c)(1),
(2), (4) Date: Mar. 27, 2008

(87) PCT Pub. No.: WO2007/036538
PCT Pub. Date: Apr. 5, 2007

(65) Prior Publication Data
US 2009/0238693 A1 Sep. 24, 2009

(30) Foreign Application Priority Data
Sep. 29, 2005 (DE) .......................... 10 2005 047 739

(51) Int. Cl.
*G01K 11/12* (2006.01)

(52) U.S. Cl. ........................................ 374/162
(58) Field of Classification Search .................. None
See application file for complete search history.

(56) References Cited

U.S. PATENT DOCUMENTS

| | | | | |
|---|---|---|---|---|
| 2,046,863 | A * | 7/1936 | Allphin | 374/102 |
| 4,729,671 | A * | 3/1988 | Asano et al. | 374/160 |
| 4,987,908 | A * | 1/1991 | Sprinkel et al. | 131/365 |
| 6,143,211 | A * | 11/2000 | Mathiowitz et al. | 264/4 |
| 6,389,797 | B1 * | 5/2002 | Sugishita et al. | 60/39.182 |
| 6,730,413 | B2 * | 5/2004 | Schaeffer et al. | 428/632 |
| 6,864,096 | B2 * | 3/2005 | Watson et al. | 436/84 |
| 7,404,925 | B2 * | 7/2008 | Watson et al. | 422/425 |
| 7,763,367 | B2 * | 7/2010 | Arndt et al. | 428/702 |
| 2004/0055420 | A1 * | 3/2004 | Garbar et al. | 75/370 |
| 2005/0169348 | A1 | 8/2005 | Chen | |

FOREIGN PATENT DOCUMENTS

| | | |
|---|---|---|
| DE | 2534668 A1 | 2/1977 |
| DE | 19537999 A1 | 4/1997 |
| DE | 19736276 A1 | 2/1999 |
| EP | 0297982 A1 | 1/1989 |
| EP | 0898158 A2 | 2/1999 |
| EP | 1645538 A1 | 4/2006 |

\* cited by examiner

*Primary Examiner* — Richard Edgar
*Assistant Examiner* — Ryan Ellis

(57) ABSTRACT

There is described a substrate with a coating; the coating contains a coating matrix in whose matrix structure multilayered and/or encapsulated nanoparticles are arranged and release a dye when a limit temperature is exceeded the first time and/or trigger a color reaction which causes the color of the coating to change irreversibly.

11 Claims, 3 Drawing Sheets

US 8,356,936 B2

SUBSTRATE WITH APPLIED COATING AND PRODUCTION METHOD

CROSS REFERENCE TO RELATED APPLICATIONS

This application is the US National Stage of International Application No. PCT/EP2006/066795, filed Sep. 27, 2006 and claims the benefit thereof. The International Application claims the benefits of German application No. 10 2005 047 739.9 DE filed Sep. 29, 2005, both of the applications are incorporated by reference herein in their entirety.

FIELD OF INVENTION

The invention relates to a substrate with an applied coating and to a production method.

The present invention relates to turbine systems in general. Although applicable in principle to any turbine systems, the fundamental problems to be solved by the invention will be explained below with reference to combined cycle (gas and steam) turbines particularly for power generating plants.

BACKGROUND OF INVENTION

Combined cycle power generating systems use a medium, e.g. water, whose boiling point and heat capacity are appropriate to the system's operating temperature. This medium is generally heated in a separate heat source such as a steam generator by means of concentrated solar radiation, combustion of fossil fuel, etc.

In combined cycle plants, the combustion of gaseous fossil fuels directly in a turbine is used to turn a gas turbine. The thermal energy liberated during combustion is then used as a heat source to generate steam which, as mentioned above, can drive a steam turbine. This combined gas and steam turbine cycle provides a very high degree of efficiency compared to conventional steam turbines.

In order to maximize efficiency, very exacting requirements are place on the materials used in the turbine, particularly in respect of their temperature and corrosion resistance. The gases in the turbines are very hot, very aggressive and possess high corrosion potential. Special alloys and steels therefore have to be used for the turbines or more specifically their blades in order to reduce e.g. stress crack corrosion. Another possibility for reducing stress crack corrosion and therefore increasing the service life of the turbines is to select a suitable coating for the turbine blade. Chromium-aluminum-yttrium alloys with cobalt, nickel or iron (MCrAlY alloy) or chromium carbide ($Cr_2C_3$) combined with chromium and nickel have been found to be advantageous.

It is important that these coating materials exhibit minimum ductility and very high toughness, particularly on the rotating turbine blades, in order to prevent peeling of the turbine blade coating. If the coating were to peel off, the underlying material of the turbine blade would be more or less unprotected from the aggressive gases. The turbine blade material would therefore be prone to stress crack corrosion damage. In addition, surface unevennesses would no longer ensure an optimum flow characteristic, accompanied by an undesirable loss of efficiency.

During combined cycle operation, very high temperatures occur, ranging from 800 to 1500° C. in gas turbines and from 400 to 600° C. in steam turbines depending on the system. These temperatures essentially determine the efficiency of the turbine. Even a deviation of few degrees can mean a significantly lower efficiency in the order of a few percent. However, the temperature is not only critical for the efficiency, but also determines the corrosion potential of the gases and dictates the ductility and toughness of the coating. The material properties of the coating used are therefore mainly optimized for a particular predefined temperature range. In this temperature range, reliable operation of the turbine can be guaranteed without damage to the turbine materials and in particular the turbine blade coatings. The exceeding, particularly for a long period, of a temperature limit can permanently damage the turbine. It is imperative to prevent this. It is therefore important to know whether the turbine has been operated above a specified temperature.

To this end, a plurality of methods for temperature measurement in turbines are known.

For example, various methods for measuring temperature are described in DE 197 36 276. The underlying physical measuring principles are based on, among other things, the temperature dependence of an electrical resistance, the Seebeck effect (thermocouple), a color reaction (thermopaint), the temperature-dependent speed of sound in gases or the spectral distribution of scattered or emitted electromagnetic thermal radiation.

Temperature sensors for turbines must be able to withstand extreme operating conditions in respect of temperature, pressure and vibration. Conventional thermocouples age very quickly under these extreme service conditions. In addition, the temperature often also has to be measured on rotating parts, which is mostly only possible using very complex telemetry. The use of thermopaints has hitherto been limited to experimental studies and is therefore not yet sufficiently reliable for the abovementioned operation in turbines. Although active laser measuring methods such as Rayleigh scattering or CARS (coherent anti-Stokes Raman scattering) are contactless, they are technically extremely complex and difficult to implement.

EP 1 645 538 A1 discloses a material composition for producing a coating, wherein the matrix material of the composition possesses in particular glass ceramic basic properties. Nanoparticles with a particle size $\leq 1$ µm are embedded in the matrix material as a filler.

DE 25 34 668 discloses the use of so-called thermographic paints on ceramic bodies, which are used for determining surface temperature conditions e.g. in furnaces. The exceeding of a particular temperature defined by the properties of the thermographic paint can be demonstrated by the thermographic coating changing color.

According to DE 195 37 999 A1, such thermographic paints can also be applied to the surface of gas turbine components subject to severe thermal stress in order to enable the temperature conditions present to be analyzed at the development stage. A color change e.g. during operation can be captured by a digital camera and allows conclusions to be drawn about the stress-dependent temperature profile in the turbine.

SUMMARY OF INVENTION

There therefore exists a need for a simple means of directly determining a temperature or rather the exceeding of a particular temperature limit in the turbine. It is also of particular interest in this context to measure the temperature directly on the surface of the materials to be examined, i.e. in the coating of the materials.

Against this background, an object of the present invention is to enable the temperature of a coating on a substrate to be determined better and in particular as simply as possible.

According to the invention at least one of these objects is achieved by a substrate having the features set forth in an independent claim, by a turbine having the features set forth in a further independent claim, and/or by a method as also claimed.

There is accordingly provided, according to a first aspect, a substrate with an applied coating which contains a coating matrix in whose matrix structure are disposed multilayer nanoparticles and/or encapsulated nanoparticles which, when a temperature limit is exceeded for the first time, release a colorant and/or trigger a color reaction causing an irreversible color change in the coating.

According to another aspect the present invention, there is provided a method for producing a substrate with an applied coating, comprising the following steps:
a) preparing a substrate;
b) preparing an electrolytic bath with nanoparticles suspended therein;
c) placing a substrate in the electrolytic bath for depositing a first coating with nanoparticles contained therein on a surface of the substrate.

The idea on which the present invention is based is that, when a temperature limit is exceeded, multilayer and/or encapsulated nanoparticles which have been incorporated into a coating produce an irreversible color change in the coating. The coating color change can be brought about by the release of an inert color particle or pigment from the nanoparticle due to melting of the encapsulation of the nanoparticle. Alternatively the color change can be brought about by reaction of metals which are present inside the encapsulated nanoparticle and are released by melting of the encapsulation, the released metal reacting irreversibly with, for example, encapsulation metals and/or coating metals to produce a colorant. Additional oxygen may be required here which is provided by the environment.

Advantageous embodiments and further developments of the invention are the subject matter of the sub-claims and of the description which proceeds with reference to the accompanying drawings.

According to a preferred embodiment of the invention, metal oxides and metal mixed oxides are principally used as pigments in the multilayer and/or encapsulated nanoparticles. These are also known as inorganic colorants or pigments. Such compounds exhibit excellent temperature stability and are largely inert. This is important in that the metal oxides or rather pigments must not diffuse into the turbine blade materials themselves, as this would alter their composition and therefore damage them. As the color particles are inert to the environment, the materials of the surrounding coating matrix are unchanged, or rather not essentially changed, or not destroyed by the color particles released.

The nanoparticles are present in the coating in a proportion which does not interfere with the coating's function. The proportion of nanoparticles is preferably, but not necessarily, less than 10% of the mass of the coating matrix. The proportion is preferably in the range from 1-8%, even more preferably in the range from 2-5%.

The pigments can contain, for example
chromium oxide ($Cr_2O_3$);
an isomorphic mixture of cobalt zincate (Rinnmann's green, Co.ZnO);
chromium oxide aluminum cobalt oxide ($CrO_3$—Al—CoO);
cobalt chromide ($CoCr_2O_4$);
cobalt titanate ($CO_2TiO_4$);
Victoria green garnet ($3CaO$, $Cr_2O_3$, $3SiO_2$) or more specifically its modifications by $Al_2O_3$, $B_2O_3$, $CaF_2$, CoO or $ZrO_2$;
cobalt aluminate (cobalt blue, $CoO.Al_2O_3$);
cobalt stannate (CoO.SnO2);
zirconium vanadium (vanadium-zirconium blue, $(Zr,V)SiO_4$);
cobalt zinc aluminate ($(Co,Zn) Al_2O_4$);
cobalt silicate ($Co_2SiO_4$);
cobalt zinc silicate ($(Co,Zn)SiO_4$) and its modification by $B_2O_3$;
strontium chromate ($SrCrO_4$);
chromium titanate yellow (titanium oxide with nickel oxide/antimony oxide/chromium oxide (Ti, Ni, Sb, Cr)$O_2$);
nickel barium titanium [primrose] priderite;
tin vanadium $(Sn, V) O_2$);
zirconium praseodymium $((Zr,Pr) SiO_4)$;
zirconium vanadium $((Zr,V) O_2)$;
nickel niobium titanium yellow rutile $((Ti,Ni,Nb)O_2)$ and its modification by $Cr_2O_3$ or SrO;
chromium niobium titanium rutile $((Ti,Cr,Nb)O_2)$ and its modification by $Cr_2O_3$ or SrO;
chromium tungsten titanium rutile;
zinc chromate ($ZnCrO_4$);
aluminum silicate with iron oxide;
iron oxide ($Fe_2O_3$);
iron silicate ($Fe_2O_3.SiO_2$);
chromium stannate ($Cr_2(SnO_3)_3$);
zinc iron oxide ($ZnFe_2O_4$);
gold aluminum corundum ($Al_2O_3$ and Au) and its modification by $Ag_2SiO_4$ or clay;
chromium aluminum corundum ($(Al,Cr)_2O_3$) and its modification by ZnO;
manganese aluminum corundum ($(Al,Mn)_2O_3$) and its modification by $P_2O_5$;
zirconium iron silicate ($(Zr,Fe)SiO_4$);
chromium tin sphene ($CaO,SnO_2,SiO_2,Cr_2O_3$) and its modification by $B_2O_3$ or PbO;
chromium aluminum spinel ($Zn(Al,Cr)_2O_4$) and its modification by $B_2O_3$, $Fe_2O_3$, MgO or PbO;
chromium tin cassiterite ($(Sn,Cr)O_3$) and its modification by $B_2O_3$, Ca or $CeO_2$; and/or
calcium aluminum silicate ($Ca_3Al_2 (SiO_4)_3$).

The abovementioned colorants as well as other colorants can react by reaction of a metal, which is released as an encapsulated nanoparticle if a temperature limit is exceeded, with a metal present in the coating alloy. For example, such coatings can be made up of an alloy of the form MCrAlY, where M can be Co, Ni, Co+Ni, Fe. It is likewise possible for the production of the colorant to be triggered by a reaction whereby the metallic encapsulation reacts with the encapsulated metal and at least one element of the coating, a plurality of variations of the different reactants being conceivable. However, the common feature of all the reactions is that a colorant is produced, with metals contributing to its production.

Metallic encapsulations can likewise be used for encapsulating the nanoparticles, soldering metals being used in particular. Examples include tin and eutectic mixtures of tin with copper, silver, lead and indium. However, any other metal which melts in a required temperature range can also be used alone or in the form of an alloy. Melting of the metallic encapsulation also causes the nanoparticle itself to be released. A metallic alloy is preferably used if metals are encapsulated as nanoparticles which produce a colorant by reaction with the coating and/or the metallic encapsulation.

For the production of the colorant, oxygen from the environment may also be required. By exposure to oxygen, the encapsulated metals may react directly to produce a corresponding oxide or mixed oxide which causes the color change. However, it is also possible for the encapsulated metals to react with at least one element of the coating alloy and/or the metallic encapsulation, additional oxygen possibly being required. Metal oxides which can react with at least one element of the coating alloy e.g. to produce another metal mixed oxide can also be used directly.

At the time of filing of this application, metal nanoparticles can be obtained e.g. from QINETIQ© Nanoparticles Ltd. Multilayer or encapsulated nanoparticles produced using LBL technology© are obtainable from Capsolution Nanoscience AG in Berlin.

As gas and steam turbines are usually operated in a temperature range of approximately 500 to 700° C., the encapsulations release the nanoparticles when a temperature limit in the range of approximately 400 to 800° C. is exceeded. The temperature sensitivity of the release varies depending on the encapsulation. Eutectic mixtures, for example, possess a defined, very precise melting point. Metallic encapsulations which use e.g. a soldering metal as encapsulation therefore release the nanoparticles at a specified temperature within a very small temperature range. In the case of high melting point plastic encapsulations, the nanoparticles are released within a range of about ±10-50° C. around the temperature limit.

In the case of combined cycle gas turbines, the period of time for which a temperature limit is exceeded is usually several hours or even days. The nanoparticles can therefore be designed such that the encapsulation is only released after being subjected to a temperature limit over a comparatively long period of time. The reactions to form the pigments usually take place within a few minutes or seconds. Released colorants are visible immediately after the breaking open of the encapsulation, provided they have been inserted at the surface of the coating. As the colorants are inert, they are also present unchanged even after a lengthy period of time.

The nanoparticles can be applied to the surface or near the surface of a turbine blade. It is therefore possible to determine visually, by means of the change in color of the coating, that a temperature limit has been exceeded. It is likewise possible to place the nanoparticles in lower layers of the coating, thereby providing an externally invisible indicator inside the turbine blades. During inspection of the turbine blades it can be determined, after the event, whether the turbine has been operated above a certain temperature limit. Such an inspection requires the removal of the topmost layers of the coating until the layer with the inserted nanoparticles is visible. Alternatively a cross-section of the turbine blade can be prepared which will reveal the color change in the coating.

Such coatings are preferably used in combined cycle gas turbines (CCGT). Thus each turbine blade can have a coating provided with encapsulated nanoparticles. The coating with the encapsulated nanoparticles can be protected by at least one further coating.

BRIEF DESCRIPTION OF THE DRAWINGS

The invention will now be explained in greater detail with reference to the examples illustrated in the accompanying schematic drawings in which.

In all the accompanying drawings—unless stated otherwise—identical elements performing identical functions are provided with the same reference numerals.

DETAILED DESCRIPTION OF INVENTION

Figure 1A:
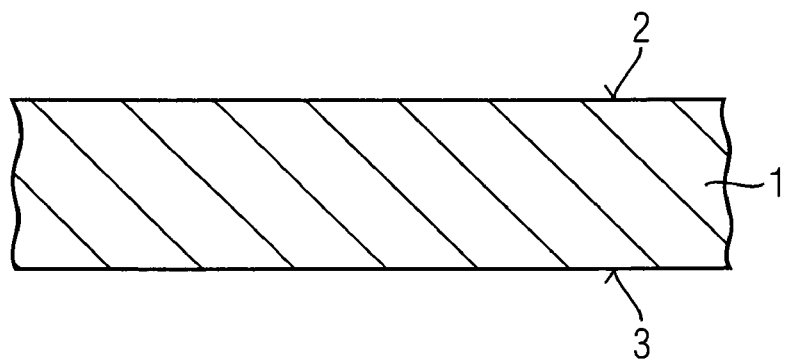
FIGS. 1a-b show schematic cross sections to illustrate a first example of the inventive method for applying a coating to a substrate.
Figure 1B:
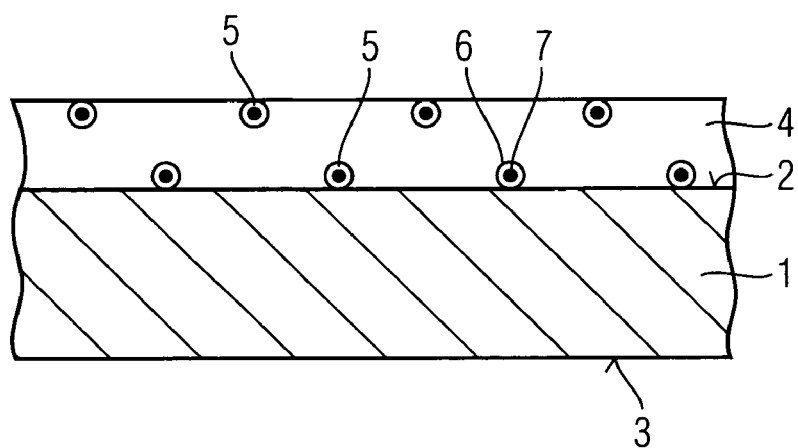

FIG. 1 shows, in sub-FIGS. 1a and 1b, schematic cross sections illustrating a first example of the inventive method for applying a coating to a substrate.

With this method, a substrate 1 is [provided] with a front first surface 2 and a rear second surface 3 (FIG. 1a). The substrate can be, for example, part of a turbine blade, e.g. a suitable steel.

To this substrate is applied, on the front first surface 2, a coating with a coating matrix 4 in which encapsulated nanoparticles 5 are inserted (FIG. 1b). An encapsulated nanoparticle 5 consists of a nanoparticle 7 which is enclosed by an encapsulation 6. The coating which constitutes a matrix for the encapsulated nanoparticles 5 is applied, for example, electrolytically, encapsulated nanoparticles 5 being dispersed in the electrolytic fluid. During electrolytic deposition of the coating matrix 4, the encapsulated nanoparticles 5 are incorporated in the coating matrix 4. A coating matrix 4 with nanoparticles 5 applied to the substrate on the first surface 2 is shown in FIG. 1b.

Figure 2:
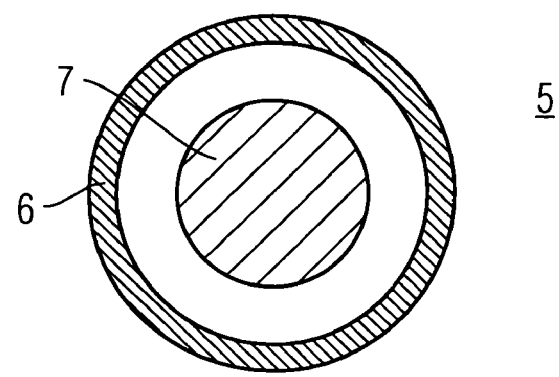
FIG. 2 shows a cross section illustrating the structure of an encapsulated nanoparticle.

FIG. 2 shows an exemplary cross section of an encapsulated nanoparticle 5, the nanoparticle 7 being enclosed by an encapsulation 6. The nanoparticle 7 can be, for example, a pigment or a metal nanoparticle. Suitable metals are any that can react with oxygen and/or constituents of the coating matrix 4 and/or the encapsulation 6 to produce a colorant. Possible colorants are any that are inert to elevated temperatures. In particular, colorants which do not decompose or change at temperatures above the temperature limit of e.g. 500°, preferably above 700°, are used.

The nanoparticle 7 could be, for example, an Mn metal nanoparticle. When released, the Mn metal reacts with the aluminum of the MCrAlY coating and oxygen to produce manganese aluminum corundum $(Mn,Al)_2O_3$, thereby causing a red coloration of the coating.

The nanoparticle 7 could also be an MnO nanoparticle. When the encapsulation 6 breaks open, the manganese oxide is released and can react with the aluminum of the MCrAlY coating and oxygen to produce manganese aluminum corundum $(Mn,Al)_2O_3$.

Alternatively the nanoparticle 7 could also be a Co metal nanoparticle. When the cobalt is released from the encapsulated nanoparticle 5, it reacts with ambient oxygen to produce a blue coloration of the coating.

As an example of a colorant, the encapsulated nanoparticle 5 could be encapsulated manganese aluminum corundum $(Mn,Al)_2O_3$. When the manganese aluminum corundum is released, it produces a red coloration of the coating.

The encapsulation 6 can contain a high melting point plastic or a metal or an alloy. The high melting point plastic, metal or alloy preferably melt in a temperature range corresponding to the temperature limit. Metal alloys are also to be understood as metal. For the encapsulation 6, eutectic mixtures such as soldering metals are preferably used here. Eutectic mixtures of this kind melt in a defined manner at a given temperature, thus allowing the encapsulated nanoparticles to be released if a given temperature limit is exceeded. The solder metals used can be e.g. tin alloys with copper silver or lead.

Figure 3A:
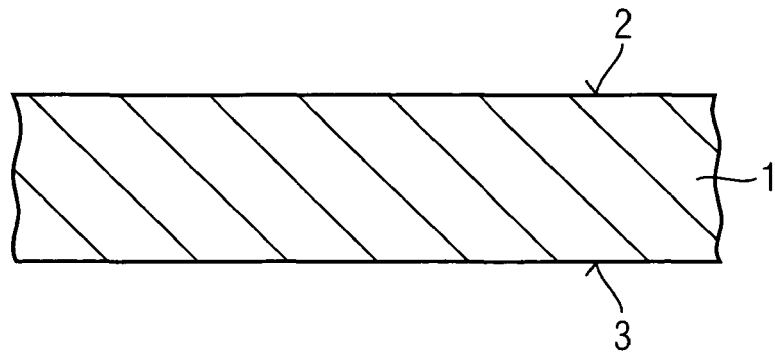
FIGS. 3a-c show schematic cross sections to illustrate another example of the inventive method for applying a coating to a substrate.
Figure 3B:
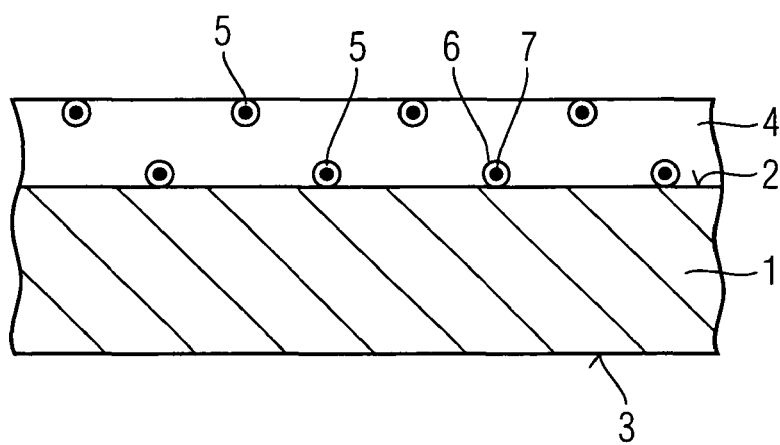
Figure 3C:
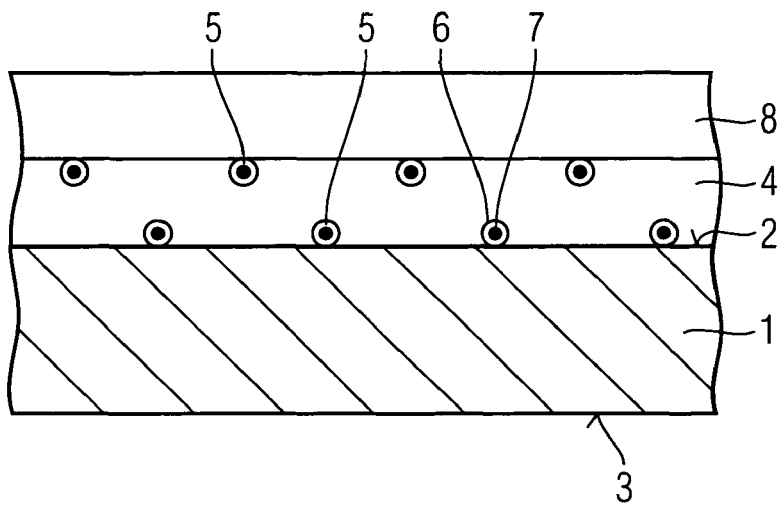

FIG. 3 shows, in sub-FIGS. 3a to 3c, schematic cross sections illustrating another example of the inventive method for applying a coating to a substrate.

Unlike the first example from FIG. 1, in this case another coating 8 is applied to the coating matrix 4 containing encapsulated nanoparticles 5. The coating 8 can be electrolytically deposited, for example. This arrangement is shown in cross section in FIG. 3c.

It is also conceivable to apply further layers with or without encapsulated nanoparticles to the substrate, it being also possible to incorporate in the coating matrix 4 encapsulated nanoparticles 5 having different properties which, for example, produce the color change at different temperatures.

Figure 4A:
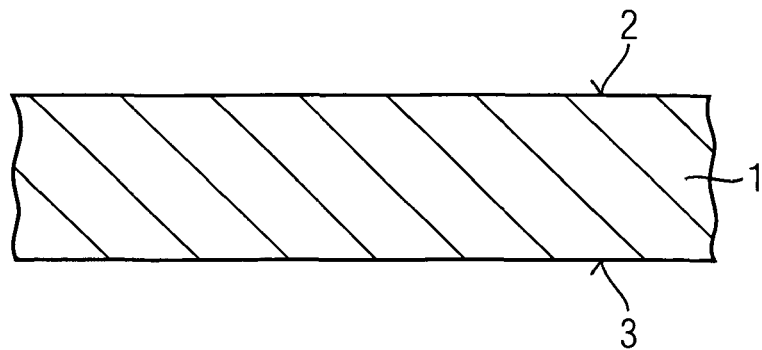
FIGS. 4a-c show schematic cross sections to illustrate a further example of the inventive method for applying a coating to a substrate.
Figure 4B:
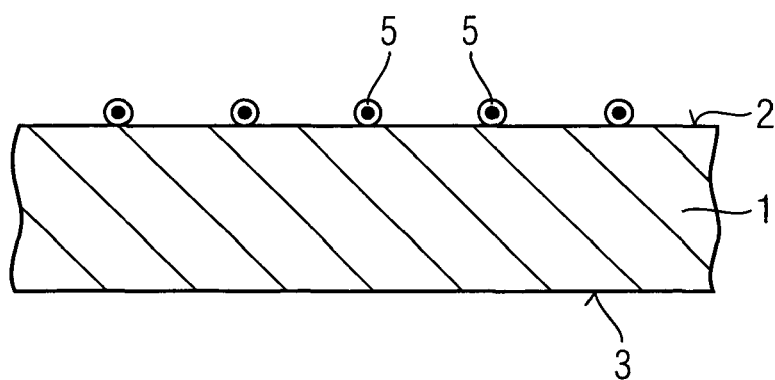
Figure 4C:
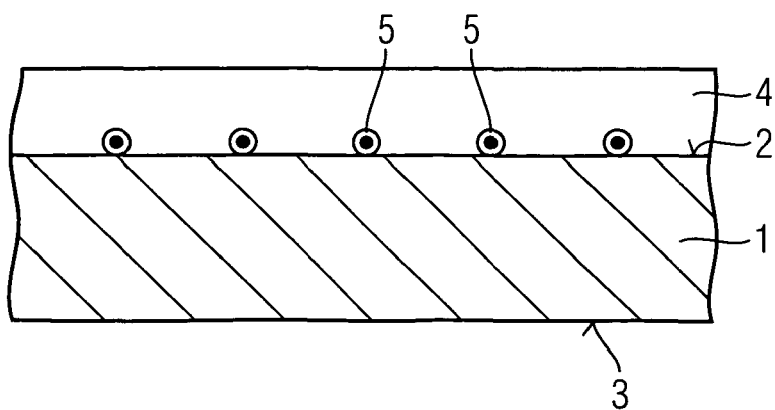

FIG. 4 shows, in sub-FIGS. 4a to c, schematic cross sections illustrating a further example of the inventive method for applying a coating to a substrate.

As illustrated in FIG. 4a, there is first provided a substrate 1 with a front first surface 2 and a rear second surface 3.

Individual encapsulated nanoparticles 5 are deposited on the first surface 2 of this substrate 1. A cross section of a substrate 1 with encapsulated nanoparticles 5 applied is shown in FIG. 4b.

The encapsulated nanoparticles 5 are then covered by a coating matrix 4. FIG. 4c shows a coating matrix 4 covering the first surface 2 of the substrate 1 and the encapsulated nanoparticles 5.

The encapsulated nanoparticles 5 contain, for example, $(Al,Mn)_2O_3$ which produces a red coloration when the encapsulation breaks open.

The encapsulated nanoparticles 5 can also contain cobalt which, when released, reacts with ambient oxygen to produce oxides, resulting in a blue coloration.

However, the encapsulated nanoparticles 5 can also contain manganese or manganese oxide which reacts with the aluminum of the MCrAlY coating and optionally ambient oxygen to produce $(Al,Mn)_2O_3$, resulting in a red coloration.

Although the present invention has been described above with reference to a preferred embodiment, it is not limited thereto but can be modified in a variety of ways.

Thus the invention shall not be limited to the specific structure of the coating or nanoparticles shown in the abovementioned figures. Rather these very nanoparticles can be modified in any desired manner without departing from the fundamental principle of the invention. In particular, the encapsulated nanoparticles can contain different colorants or metals. It is also conceivable for encapsulated nanoparticles with different encapsulations and different colorants and/or metals to be incorporated in the coating in order to indicate whether different temperature limits have been exceeded.

The invention claimed is:

1. A metallic substrate, comprising:
a metallic coating applied to the metallic substrate, wherein the metallic coating has a coating matrix, wherein nanoparticles are disposed in the coating matrix, wherein the particles cause an irreversible color change in the coating the first time a temperature limit is exceeded,
wherein at least one of the nanoparticles is encapsulated with a high melting point plastic or a metallic encapsulation which only melts at high temperatures corresponding to the temperature limit, and
wherein the temperature limit is in the range of 400° C. to 800° C.

2. The substrate as claimed in claim 1, wherein at least a plurality of the particles are multilayer nanoparticles.

3. The substrate as claimed in claim 2, wherein the multilayer nanoparticles release a colorant or trigger a color reaction to cause the irreversible color change in the coating the first time the temperature limit is exceeded.

4. The substrate as claimed in claim 1, wherein at least a plurality of the particles are encapsulated nanoparticles.

5. The substrate as claimed in claim 4, wherein the multilayer nanoparticles release a colorant or trigger a color reaction to cause the irreversible color change in the coating the first time the temperature limit is exceeded.

6. The substrate as claimed in claim 1, wherein at least one of a plurality of encapsulated nanoparticles contains an element to trigger a color reaction with at least one element of the coating matrix the first time the temperature limit is exceeded.

7. The substrate as claimed in claim 1, wherein at least one of the nanoparticles contains an element which triggers the color reaction with at least one element of an encapsulated nanoparticle and/or at least one element of the coating matrix the first time the limit temperature is exceeded.

8. The substrate as claimed in claim 1, wherein a colorant for the irreversible color change is an inorganic colorant.

9. The substrate as claimed in claim 1, wherein the substrate is a turbine blade or a part of a turbine blade.

10. A metallic substrate, comprising:
a metallic coating applied to the metallic substrate, wherein the metallic coating has a coating matrix, wherein nanoparticles are disposed in the coating matrix, wherein the particles cause an irreversible color change in the coating the first time a temperature limit is exceeded,
wherein at least one of the nanoparticles is encapsulated in a metallic encapsulation with a metal melting only at high temperatures corresponding to the temperature limit,
wherein the temperature limit is in the range of 400° C. to 800° C., and
wherein the substrate is a turbine blade or a part of a turbine blade.

11. The substrate as claimed in claim 10, wherein the metallic encapsulation has a metal which triggers the color reaction with at least one other element of the encapsulated nanoparticle and/or at least one element of the coating matrix when the limit temperature is exceeded.

* * * * *